United States Patent
Brodigan

(10) Patent No.: US 6,380,971 B1
(45) Date of Patent: Apr. 30, 2002

(54) VDSL VIDEO/DATA SET TOP TEST EQUIPMENT

(75) Inventor: Donald L. Brodigan, Broomfield, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/322,970

(22) Filed: May 28, 1999

(51) Int. Cl.[7] .............................................. H04N 17/00
(52) U.S. Cl. ..................... 348/180; 348/181; 348/192; 725/107; 370/241; 370/247
(58) Field of Search ................................ 348/180, 181, 348/192, 185, 177, 184; 725/107, 111, 109, 110; 370/241, 242, 247, 248, 251; 379/27.01, 26.01, 1.03, 1.04, 15.03, 22.04; H04N 17/00

(56) References Cited

U.S. PATENT DOCUMENTS

| | | | | |
|---|---|---|---|---|
| 5,410,343 A | * | 4/1995 | Coddington et al. ............ | 348/7 |
| 5,559,854 A | * | 9/1996 | Suzuki ......................... | 379/27 |
| 5,586,111 A | * | 12/1996 | Wise .......................... | 370/241 |
| 5,654,751 A | * | 8/1997 | Richard, III ................. | 348/192 |
| 5,764,284 A | | 6/1998 | Stoker | |
| 5,808,671 A | * | 9/1998 | Maycock et al. ........... | 348/180 |
| 5,859,895 A | * | 1/1999 | Pomp et al. .................. | 379/29 |
| 5,874,992 A | * | 2/1999 | Cporizzo ..................... | 348/192 |
| 5,883,883 A | * | 3/1999 | Baker et al. ................. | 370/250 |
| 5,978,019 A | * | 11/1999 | Copeland .................... | 348/180 |
| 5,987,061 A | | 11/1999 | Chen | |
| 6,002,671 A | | 12/1999 | Kahkoska et al. | |
| 6,021,167 A | * | 2/2000 | Wu ............................. | 375/354 |
| 6,075,552 A | * | 6/2000 | Hasegawa ................... | 348/192 |
| 6,076,113 A | * | 6/2000 | Ramanathan et al. ....... | 709/235 |
| 6,292,468 B1 | * | 9/2001 | Sanderson ................... | 370/241 |
| 6,304,578 B1 | * | 10/2001 | Fluss ........................... | 370/413 |

FOREIGN PATENT DOCUMENTS

WO          WO 94/05119          * 3/1994

* cited by examiner

Primary Examiner—Wendy R Garber
Assistant Examiner—Jean W. Deésir
(74) Attorney, Agent, or Firm—Townsend and Townsend and Crew LLP

(57) ABSTRACT

A VDSL customer drop testing arrangement and equipment utilizes a test set top box having a sign-on identifier unique to an authorized test device to perform testing of the customer drop without the need to provision the drop for receipt of video programming or data services from any network information or service providers (VIPs or DSPs). Because the test arrangement of the present invention does not require such provisioning, isolation of the customer drop is achieved. Such isolation insures that the test set is not being affected by problems originated from a VIP or DSP.

10 Claims, 3 Drawing Sheets

VDSL VIDEO/DATA SET TOP TEST EQUIPMENT

TECHNICAL FIELD

The present invention generally relates to testing arrangements for VDSL based communication networks having combined video and data services, and more particularly to an arrangement for testing a physical VDSL network drop to a user location.

BACKGROUND ART

Digital Subscriber Line signal architectures, generally denoted as xDSL, allow digital distribution of combined broadband video and data services with traditional narrowband voice transmissions.

One form of xDSL of particular interest to the present invention is VDSL (Very high speed Digital Subscriber Line), which is a packet-based transmission architecture used to provide extremely high bandwidth distribution of digital video and data signals to customer buildings. A VDSL-based architecture can advantageously provide a single platform for supporting bandwidth-intensive applications, such as Internet access, remote LAN access, video conferencing, and video-on-demand.

ADSL or asymmetric digital subscriber line services generally use existing unshielded twisted pair (UTP) copper wires from a telephone company's central office to the subscriber's premise, utilize electronic equipment in the form of ADSL modems at both the central office and the subscriber's premise, send highspeed digital signals up and down those copper wires, and send more information one way than the other. The ADSL flavor of xDSL services is capable of providing a downstream bandwidth of about 1.5 Mbps–8 Mbps, and an upstream bandwidth of about 16 Kbps–64 Kbps with loop distances ranging from about 3.7 km–5.5 km. HDSL or high bit rate digital subscriber line services provide a symmetric, high-performance connection over a shorter loop, and typically require two or three copper twisted pairs. HDSL is capable of providing both upstream and downstream bandwidth of about 1.5 Mbps, over loop distances of up to about 3.7 km. SDSL or single line digital subscriber line services provide a symmetric connection that matches HDSL performance using a single twisted pair, but operating over a shorter loop of up to about 3.0 km.

VDSL services are typically implemented in an asymmetric form having a downstream transmission capability of about 52 Mbps over twisted pair copper wire arranged in local loops of 300 m, 26 Mbps at 1,000 m, and 13 Mbps at 1,500 m. Upstream data rates in asymmetric implementations tend to range from about 1.6 Mbps to about 2.3 Mbps. A typical distribution system includes a central office equipped with a host digital terminal (HDT) and arranged to operate as a hub between multiple video information providers (VIPs)/digital service providers (DSPs) and customer residential dwellings. In a fiber-to-the-neighborhood (FTTN) type distribution system, optic fiber (e.g. OC-3c and OC-12c) lines are used to connect the central office to a universal system access multiplexer (USAM), which is then connected to a network interface device (NID) located on the customer property via twisted pair copper wire. A dedicated VDSL loop extends between the NID and an individual customer residence using an existing POTS or telephone system twisted pair wire, and a customer interface device, such as a residential gateway or set top box, provides a connection point for a customer television or personal computer. A fiber-to-the-curb (FTTC) type distribution system is similar except that a broadband network unit (BNU) is used in place of the USAM, and coaxial cable is used to connect the BNU, NID, and set top box.

The VDSL signal format is used to carry signals to and from the customer. In these systems, the central office provisions each user for programming access rights, and maintains a profile database for each provisioned customer at the HDT to control the signals/channels that can be viewed by the customer.

In this environment, each of the various components and connections play a critical role in maintaining signal and network integrity. One element of particular concern involves the network drop to each customer location. To date, a suitable test arrangement has yet to be developed which would allow each drop to be tested without actual provisioning of video/data service to the customer location. Because of service activation overhead and costs as well as potential theft of services concerns involved with having a drop be provisioned without verifying the drop's ability to support quality signal distribution, a need exists for an economical arrangement for testing a physical drop to a customer site that does not require pre-provisioning of the drop.

DISCLOSURE OF INVENTION

Therefore, it is an object of the present invention to provide an xDSL/VDSL network test set and system capable of qualifying a customer drop without requiring the drop to be provisioned for receipt of services.

It is another object of the present invention to provide a VDSL network test set which allows a field technician to detect ATM cell loss and delay.

It is a further object of the present invention to provide a VDSL test system which allows verification of proper receipt of video/data signals at a customer NID, as well as out signaling capability for change of channel commands.

It is yet another object of the present invention to provide an economical VDSL test set which can be used by a field technician to pre-provision test a customer drop, as well as provide post fault network isolation.

In accordance with these and other objects, the present invention provides a system for testing performance capability of a user drop in an xDSL-based video and data communication network includes a network video signal test source and a network data signal test source arranged to generate at least one video test channel and one data test line. The network includes a signal processing arrangement for converting the test signals to an xDSL format for transmission on a network cable. A test device is coupled to the user drop and is provided with a network sign-on identifier for identifying the device as a test device. A network entitlement controller is arranged to provision user drops for receipt of video programming and data from a network distribution system. The network entitlement controller arranged to provision an unprovisioned customer drop for receipt of the network video test channel and the network data test line in response to receipt of a test device sign-on identifier, wherein the test device is arranged to test the user drop for video signal quality, and data transfer rate, error and loss conditions based on the generated test signals.

In accordance with one aspect of the present invention, the test device is formed as a modified user et top box. The video signal quality is determined by connecting a video monitoring device such as a television to an output of the test device. Alternatively, indicator lights can be provided on the test device to provide an indication of signal quality. The data transfer rate, error and loss conditions can be tested by connecting a suitably programmed computer to an output of the test device, or by incorporating such a microprocessor based system in the test device itself.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
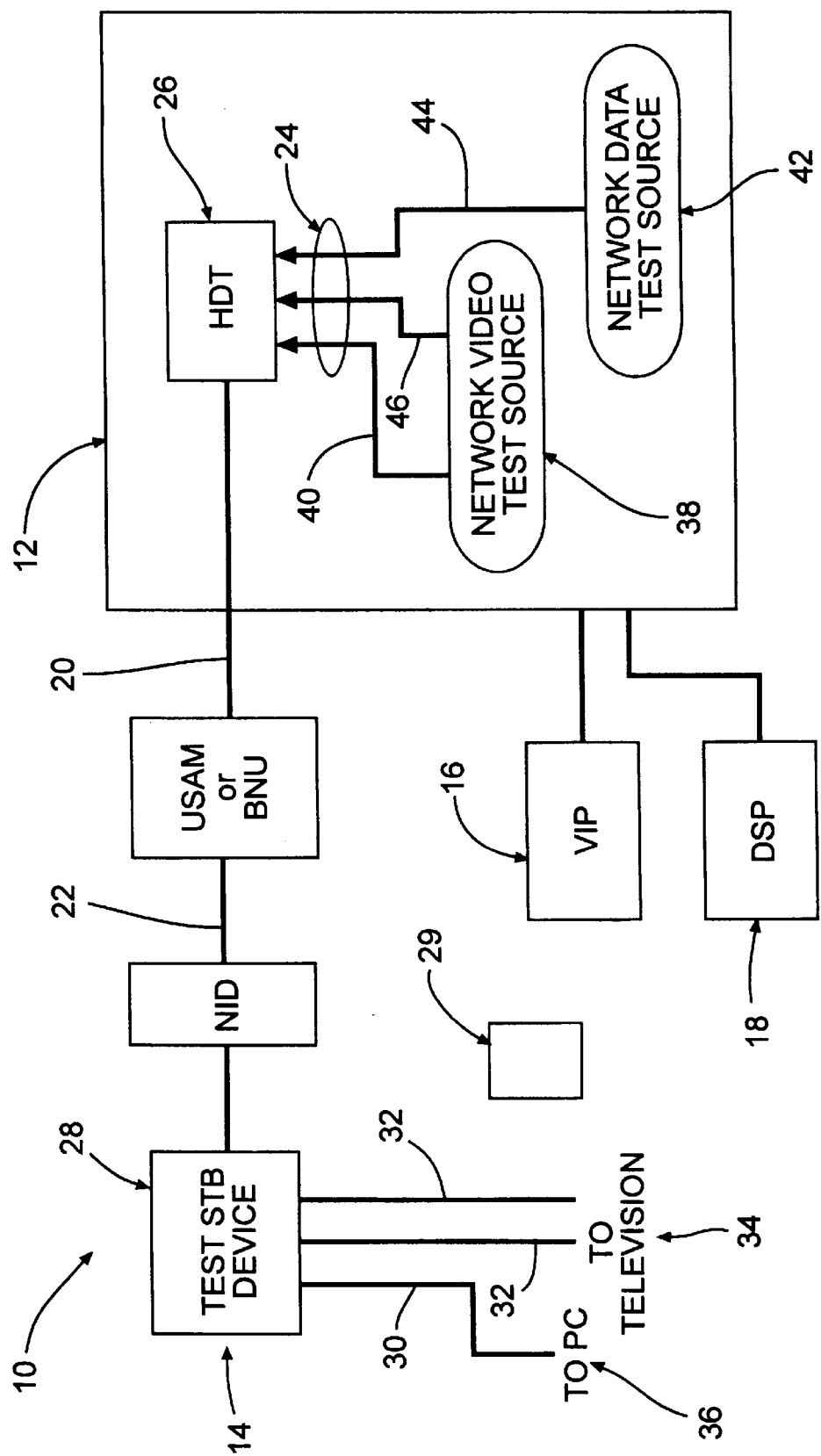
FIG. 1 is a block diagram of a VDSL-based distribution communication system including the network test system in accordance with an exemplary embodiment of the present invention.

Referring to FIG. 1, a VDSL communication network in accordance with an exemplary embodiment of the present invention is generally indicated at 10 and includes a central office 12 connected to one or more outside multi-media type service providers and arranged to operate as a network hub for redistributing received signals between the outside service providers and one or more customer sites 14. For example, video signals are provided from an outside video information provider (VIP) 16, and digital data signals are received from an outside data service provider (DSP) 18 such as a suitable Internet server. The central office processes the received signals for retransmission by an VDSL transmission unit onto a distribution line formed from a fiber optic cable 20 and a twisted pair copper cable 22. The central office can include a class 5 digital switch (not shown) for coupling of telephony traffic such as DS-1 service to and from fiber optic cable 20 by way of a broadband digital terminal. The central office further includes appropriate MPEG encoder/decoder circuitry and a multiplexer arrangement for supporting transmission of VDSL formatted signals on cable 20, thereby supporting combined narrowband telephony and broadband digital video and data signals on the same distribution line.

It is noted that while the exemplary embodiment of the present invention is described in connection with a VDSL-based system, the present invention can be employed using any type of xDSL format.

The combined signals are preferably transmitted using an asynchronous transfer mode (ATM) protocol on an ATM network 24 located in the central office. Such a protocol requires ATM framing of the signals to include a timing signal used by a receiving unit decoder to decode the signal payload. Examples of suitable fiber optic cable 20 include OC3c or OC12c cable, while twisted-pair cable 22 is preferably implemented using Category (CAT) 5 twisted copper pair wire.

At the central office, the ATM network is coupled to host digital terminal (HDT) 26 which is operative to maintain control over signals sent to the customer cites by via a customer access/entitlement right profile stored in the HDT. Such a profile can be maintained as a database of MAC addresses assigned to certain rights. To have programming rights, a customer drop must be properly provisioned or authorized by the central office. The HDT is coupled to at least one USAM or BNU located near a customer site via cable 20. As noted previously, a USAM is used in a FTTN type network configuration, while a BNU is used in a FTTC type network configuration. More specifically, a USAM is located near the customer site within 4,000 feet (≈1220 m) of a central point of connection network interface device (NID) located at the customer site. A BNU is typically located deeper in the network, such as within 150 feet of the customer building. The USAM or BNU are arranged to operate as a single platform for voice, video, and data signals.

The test equipment 28 of the present invention is arranged as a conventional set top box (STB) modified to have a unique type and subtype value stored therein. This value is used during sign-on procedures and allows the central office to not only identify the STB as a test device, but to identify an individual test unit from a plurality of test devices which may be assigned to a network's service department. The STB includes a conventional remote control unit 29.

Test STB 28 further includes at least one data port such as an 10baseT Ethernet port 30 to allow connection to personal computer 36, and at least one MPEG2 video decoder port 32 to allow connection to a television/VCR 34. In a preferred embodiment, four or more video ports are provided to allow connection of up to four televisions/VCRs to the network using only a single STB.

In further accordance with the present invention, central office includes a network video test source 38 having suitable MPEG2 encoders for generating a video test signal on at least one video test channel 40, and a network data test source 42 for generating a data test signal on a data test line 44. In a preferred embodiment, at least a second video test channel 46 is provided to allow testing of the ability of the customer drop to forward channel change commands from the STB.

Figure 2:
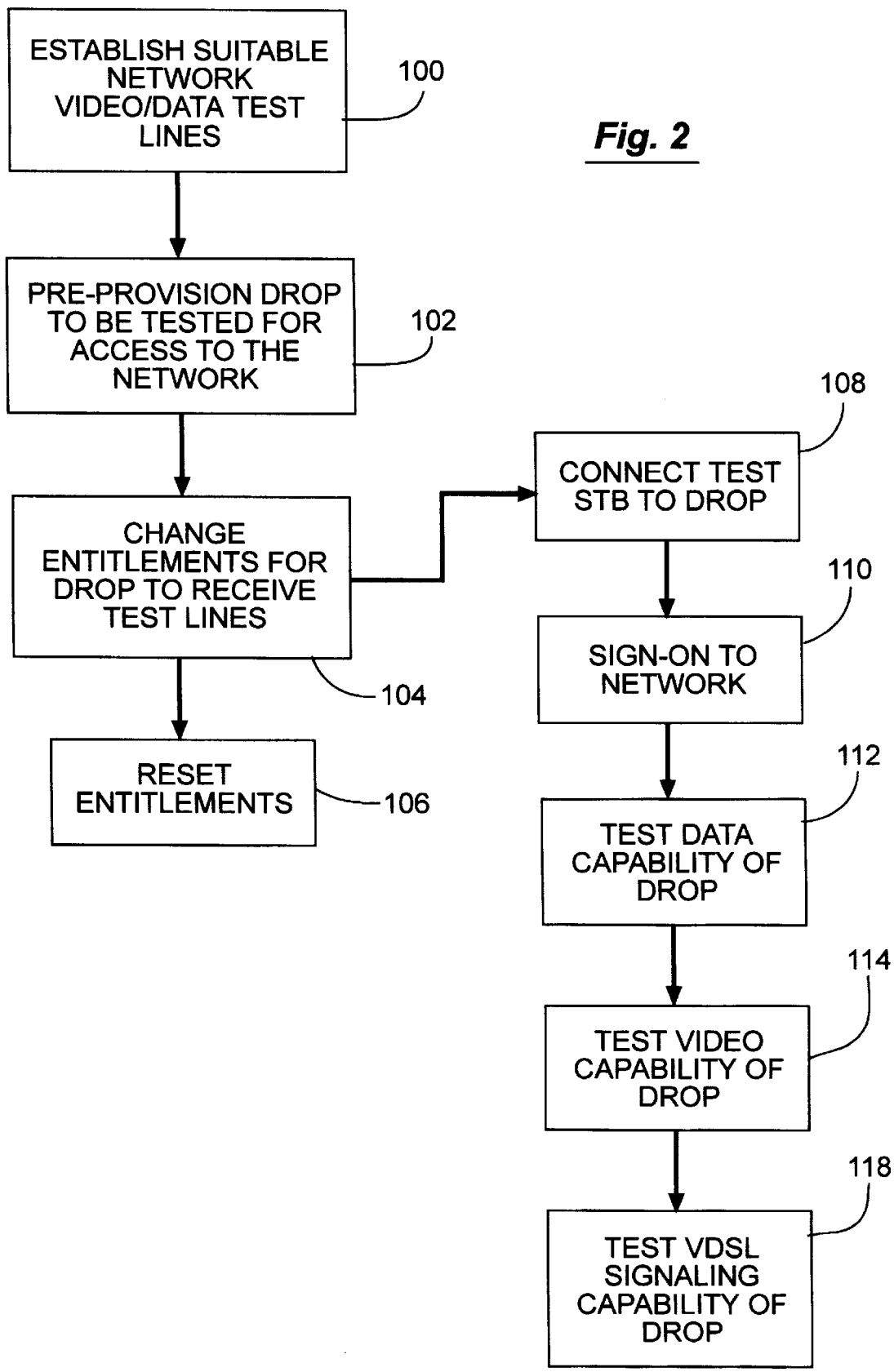
FIG. 2 is flow chart showing the overall testing process of the present invention.

The overall testing process of the present invention will now be described in connection with the flow chart shown in FIG. 2. More specifically, as denoted at block 100, the first step is to establish suitable network video/data test lines to the NID. In addition, the VDSL physical drop to be tested will be initially pre-provisioned at block 102 to allow access to the network video/data test lines at the customer site. This pre-provisioning of the VDSL drop will restrict access to test lines to only an STB having the proper type and subtype value denoting a test device at the time of sign-on. This prevents access by standard video or data receiver/decoder devices used by a customer once the drop has been provisioned for receipt of actual services/programming.

As indicated at block 104, entitlement to receive the test channels, i.e., the test service handle, could be added to a normal channel line-up sent to a drop/STB connection when such a drop is to be tested. Alternatively, the drop's normal entitlement can be change to only allow entitlement to the test channels. As further denoted at block 106, such a test service handle would either be removed manually after testing, or automatically after elapse of a predetermined period of time such as two hours. Such entitlement change could involve both video and data test lines.

At block 108, the test STB is connected to the customer drop for appropriate sign-on to the network at block 110. As noted before, the STB equipment type and sub-type value is sent to the central office with the sign-on message, thereby allowing the central office to provision for the drop test profile and authorize access to the test lines. A normal STB serial number, i.e., MAC address, is ignored by the network when the STB sends an appropriate test device type/subtype value in the sign-on request.

Once connected and pre-provisioned, data capability is tested block 112 by a technician launching a program on a PC connected to the STB so as to request transfer of prearranged test data files from the network data test source 42. The program can be arranged in accordance with known programming techniques to measure the time required to receive the file(s) so as to provide verification of the transfer rate. In addition, CRC checking can be performed on data files of known size to identify errors and loss of data. Video quality is tested as denoted at block 14 by viewing the video test signals generated by the network video test source 38 on a standard TV connected to the test STB.

As denoted at block 118, VDSL signaling capability over the drop is tested both from the test STB being able to sign-on to the network, as well as by generating channel change commands for changing between the two test channels. In addition, impulse pay-per-view (IPPV) signaling capability can be tested by generating appropriate IPPV request signaling. The central office could verify receipt of such signaling and update a database accordingly. Alternatively or in combination therewith, the field technician can also note proper drop signaling capability by monitoring the manner in which the network responds to the signal testing.

Figure 3:
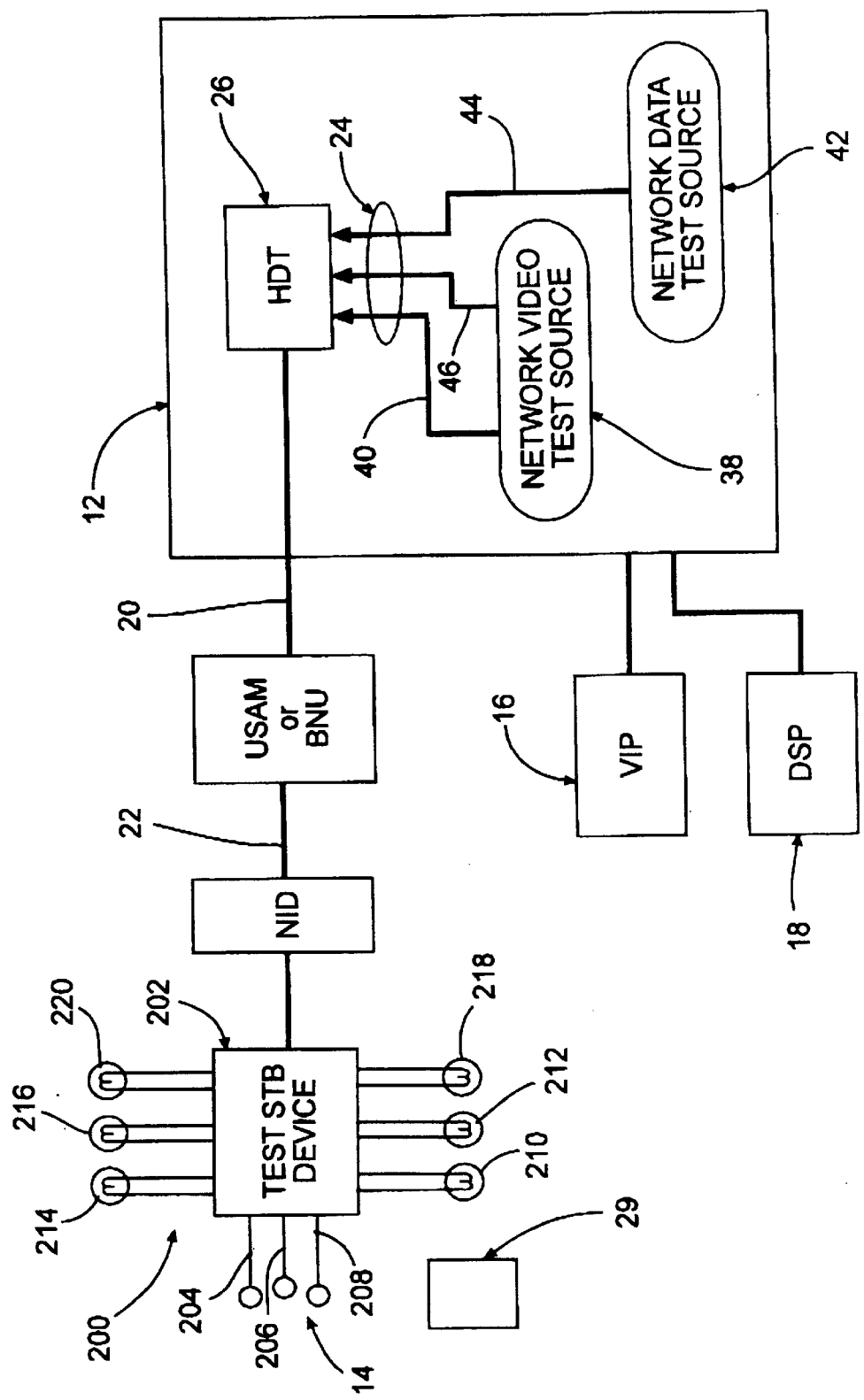
FIG. 3 is a block diagram of a second test set embodiment in accordance with the present invention.

Referring now to FIG. 3, a second embodiment 200 of a test set in accordance with the present invention is shown having a set of test switches or buttons integrated onto a housing 202 that can be actuated to initiate each of the above-described tests. In this embodiment, the data testing program would be stored and executed by a microprocessor located in the test set. For example, a button 204 launches the data testing capability by causing the test set to request data file transfer for measuring default transfer rate, a button 206 can initiate testing of and error detection, and a button 208 can initiate testing for data loss (ATM cell loss) detection. Multiple buttons can be used to generate requests for data files of different predetermined lengths.

In addition, a set of test lamps would be provide to display the results of each test. For example, a go-lamp 210 and a fail-lamp 212 can be used to indicate whether a default transfer rate had been measured, and indicator lamps 214 and 216 can be illuminated respectively upon the detection of errors and loss of data. A lamp 218 and 220 can be associated with each video test channel to indicate whether an acceptable signal quality (such as signal-to-noise ratio) has been received. With this embodiment, the test set would be able to perform testing of drop performance without requiring a technician to have a PC or a TV on site. Otherwise, test set 200 is similar to test set 28 and would use the same equipment type and sub-type.

Thus, the present invention provides a VDSL customer drop testing arrangement and equipment which can perform testing without provisioning the drop for receipt of video programming or data services from VIPs or DSPs. In addition, because the test arrangement of the present invention does not require such provisioning, isolation of the customer drop is achieved. Such isolation insures that the test set is not being affected by problems originated from a VIP or DSP.

While the best mode for carrying out the invention has been described in detail, those familiar with the art to which this invention relates will recognize various alternative designs and embodiments for practicing the invention as defined by the following claims.

What is claimed is:

1. A system for testing performance capability of a user drop in an xDSL-based video and data communication network comprising:
    a network video signal test source and a network data signal test source arranged to generate at least one video test channel and one data test line, the network including a signal processing arrangement for converting the test signals to an xDSL format for transmission on a network cable;
    a test device coupled to the user drop having a network sign-on identifier for identifying the device as a test device; and
    a network entitlement controller arranged to provision user drops for receipt of video programming and data from a network distribution system, said network entitlement controller arranged to provision an unprovisioned customer drop for receipt of the network video test channel and the network data test line in response to receipt of a test device sign-on identifier, wherein said test device is arranged to test the user drop for video signal quality, and data transfer rate, error and loss conditions.

2. The system of claim 1 wherein the test device comprises a user set top box modified to use the test device network sign-on identifier.

3. The system of claim 1 wherein the network video signal test source generates at least two video test channels, and the test device is arranged to test xDSL signaling capability of the user drop by generating a channel change command to change between the at least two video test channels.

4. The system of claim 1 wherein the test device comprises at least one video output port and at least one data output port.

5. The system of claim 4 further comprising a video display device connected to the at least one video output port, wherein the video signal quality is tested by viewing the received test channel on the video display device.

6. The system of claim 4 further comprising a personal computer connected to the at least one data output port, wherein the personal computer is programed to request transfer of a test data file of known size to measure transfer rate.

7. The system of claim 6 wherein the personal computer is further programmed to request a test data file of known content, and to compare the received file with the known file to provide error and loss of data detection.

8. The system of claim 1 wherein the test device comprises a set of test indicators for displaying the result of each test.

9. The system of claim 1 wherein the test device further comprises a microprocessor system programed to request transfer of a test data file of known size to measure transfer rate.

10. The system of claim 9 wherein the microprocessor system is further programmed to request a test data file of known content, and to compare the received file with the known file to provide error and loss of data detection.

* * * * *